(12) United States Patent
Dubots et al.

(10) Patent No.: US 6,403,155 B2
(45) Date of Patent: Jun. 11, 2002

(54) HIGH PURITY, SILICONIZED SILICON CARBIDE HAVING HIGH THERMAL SHOCK RESISTANCE

(75) Inventors: Dominique Dubots, Sallanches (FR); Andrew Haerle, Northboro, MA (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 18 days.

(21) Appl. No.: 09/748,568

(22) Filed: Dec. 21, 2000

Related U.S. Application Data

(62) Division of application No. 09/210,635, filed on Dec. 11, 1998, now Pat. No. 6,162,543.

(51) Int. Cl.[7] .............................................. C04B 35/565
(52) U.S. Cl. ............................ 427/255.12; 427/255.27; 501/88; 423/345
(58) Field of Search .............................. 264/45.1, 628, 264/642, 682, 134, 29.5; 501/88; 423/345; 427/255.11, 255.12, 255.27

(56) References Cited

U.S. PATENT DOCUMENTS

| 3,951,587 A | 4/1976 | Alliegro et al. ............ 432/253 |
| 4,771,021 A | 9/1988 | Tamamizu et al. ............ 501/90 |
| 4,795,673 A | 1/1989 | Frechette et al. ............ 428/331 |
| 5,589,116 A | 12/1996 | Kojima et al. ............ 264/65 |
| 6,162,543 A | * 12/2000 | Dubots et al. ............ 428/408 |

FOREIGN PATENT DOCUMENTS

| JP | 1264969 | 10/1989 | ............ C01B/31/36 |
| JP | 2721678 | 3/1998 | |

OTHER PUBLICATIONS

Poco Graphite, Inc.; Decatur, Texas; 23 pages (No date).
Dr. M.L. Torti, Dr.J>G. Hannoosh, Dr. S. D. Hartline, D.B. Arvidson, Jr.; "High Prformance Ceramics For Heat Engine Applications", The Amer. Society of Mechanical Engineers; 84–GT–92; pp. 1–9 (No date).
G.Q. Weaver, B.A. Olson; "High Strength Silicon Carbide For Use In Severe Environments" International Conference on SiC–1973; pp. 1–4 No date.

* cited by examiner

Primary Examiner—Deborah Jones
Assistant Examiner—Stephen Stein
(74) Attorney, Agent, or Firm—Mike W. Crosby

(57) ABSTRACT

This invention is a high strength, thermal shock resistant, high purity siliconized silicon carbide material made from siliconizing a converted graphite SiC body having at least 71 vol % silicon carbide therein.

9 Claims, 4 Drawing Sheets

HIGH PURITY, SILICONIZED SILICON CARBIDE HAVING HIGH THERMAL SHOCK RESISTANCE

"This application is a division of U.S. Patent Application Ser. No. 09/210,635, filed on Dec. 11, 1998, now U.S. Pat. No. 6,162,543, now allowed, and claims priority to and the benefit of the filing date of said prior application."

BACKGROUND OF THE INVENTION

The manufacture of semiconductor devices such as integrated circuits typically involves heat treating silicon wafers in the presence of reactive gases at temperatures of from about 250° C. to over 1200° C. The temperatures and gas concentrations to which these wafers are exposed must be carefully controlled, as the ultimate devices often include circuitry elements less than 1 um in size which are sensitive to minute variations in the wafer processing environment.

The semiconductor manufacturing industry has typically used either horizontal or vertical carriers made of silicon carbide or siliconized silicon carbide as kiln furniture for the wafers, and these carriers have been designed to hold up to about 50 wafers. When such conventional carriers are used, the processing steps generally involve fairly slow ramp rates of between about 10° C. and 30° C./minute.

However, because of increasingly strict wafer performance and efficiency requirements, the industry has been considering adopting Rapid Thermal Processing (RTP) wafer processing techniques. According to U.S. Pat. No. 4,978,567 ("Miller"), under RTP conditions, the wafers are treated in an environment whose temperature rises from room temperature to up to about 1400° C. in a period of time on the order of seconds. Typical RTP ramp rates are on the order of 600–6000° C./minute. Under such extreme processing conditions, the thermal shock resistances of the materials in this environment are of critical importance.

Miller discloses RTP wafer carriers made of stand-alone CVD silicon carbide, and carriers made of graphite coated with CVD silicon carbide. However, the cost of stand-alone CVD silicon carbide is often prohibitive, while carriers made of graphite coated with CVD silicon carbide suffer from a significant mismatch of coefficients of thermal expansion ("CTE") which makes the composite susceptible to thermal shock.

Siliconized silicon carbide has been considered as a candidate material for kiln furniture in RTP systems. In particular, U.S. Pat. No. 5,514,439 ("Sibley") has disclosed RTP kiln furniture in which siliconized silicon carbide is the material of choice. However, in one test involving a commercially available siliconized silicon carbide ("Si—SiC") material commonly used as kiln furniture in conventional wafer processing, it was found that this Si—SiC material lost 40% of its flexural strength (from 261 MPa to 158 MPa) when subjected to a thermal quench test in which the temperature of the environment surrounding the material dropped from 500° C. to 0° C. nearly instantaneously.

The finding that the above-mentioned siliconized silicon carbide does not have outstanding thermal shock resistance in RTP environments is not surprising. Torti et al, in "High Performance Ceramics for Heat Engine Applications", ASME 84-GT-92, discusses another siliconized silicon carbide material (NC-430) made by a reaction bonding process which reportedly has high thermal shock resistance. However, Torti et al. also disclose that this NC-430 material has a Tc value of only 275° C., which appears to mean that a significant strength reduction occurs if this material is instantaneously subjected to a temperature differential of only 275° C. Weaver et al. in "High Strength Silicon Carbide For Use In Severe Environments" (1973) reports that a hot pressed SiC material comprising 95–99% SiC has a poor thermal shock resistance.

Therefore, there exists a strong need for a siliconized silicon carbide material which has a thermal shock resistance suitable for its use in kiln furniture designed for RTP applications.

In addition to the more strict thermal shock requirements, another trend in the semiconductor manufacturing industry has been the steady decrease in the level of acceptable metallic contamination in the processed wafers. Accordingly, the industry has concurrently required the kiln furniture to be made of increasingly higher purity materials.

As it is known that the "converted graphite" type of silicon carbide has very low levels of metallic contamination, the art has considered making SiC kiln furniture from converted graphite materials. The process of making such converted graphite materials involves exposing a porous graphite body to SiO gas under carefully controlled conditions which allow a 50% replacement of carbon atoms in the graphite matrix with silicon atoms and the ultimate production of a stoichiometric beta—SiC body. JP Kokai Publication No. 1–264969 (1989) ("Tanso") teaches siliconizing one 30% porous SiC material made from converted graphite to essentially full density, and using that siliconized material as a wafer boat in semiconductor wafer processing operations. Tanso further teaches that its essentially non-porous siliconized product made from its process can have a density of from 2.9 g/cc to 3.2 g/cc. Since silicon and silicon carbide have respective densities of 2.33 g/cc and 3.21 g/cc, respectively, Tanso appears to disclose siliconized SiC products having from 64 vol % to 99 vol % silicon carbide. However, the actual enabling technology disclosed by Tanso appears to be limited to only lower SiC fraction bodies. In particular, Tanso teaches that the reason for its successful conversion of graphite to stoichiometric SiC was its decision to limit the density of the graphite starting body to no more than 1.50 g/cc in order to provide enough porous passages within the graphite body to allow complete infiltration of the SiO gas. Since following this suggestion appears to limit the density of the converted SiC body to only about 2.25 g/cc, Tanso appears not to teach how to make a converted graphite SiC body having a density of over 2.25 g/cc (or 70.09 vol % SiC), and so does not further teach a siliconized SiC body having over 70.09 vol % SiC.

One known commercial producer of converted graphite for use in semiconductor wafer processing offers a porous beta—SiC material made from converted graphite and having a density of 255 g/cc, or about 80 vol % SiC. However, the reported room temperature flexural strength of this material (25 ksi, or about 175 MPa) is relatively low. Typically, a room temperature flexural strength of at least about 230 MPa is highly preferred for commercially useful SiC diffusion components. Moreover, although it is known that siliconizing a porous SiC body typically enhances its strength, a brochure from the above-mentioned producer discourages siliconizing this porous converted graphite product having 80 vol % SiC for fear of thermal expansion mismatch consequences. In particular, according to the producer's brochure, the difference in the coefficients of thermal expansion ("CTE") between silicon (CTE=2.5–4.5× $10^{-6}/°$ C.) and silicon carbide (CTE=4.8× $10^{-6}/°$ C.) is so great that, on cooldown from siliconization, the SiC contracts much more than the silicon, and this creates stresses of the intergrain bonds in the SiC during both cooldown from siliconization and subsequent thermal cycles. Therefore, it appears this brochure actively discourages the siliconization of porous converted graphite products having over 71 vol % SiC for fear of producing strength-degrading cracks in the composite material. Therefore, there is a further need for a siliconized silicon carbide material having over 71 vol % silicon carbide (preferably over 75 vol % SiC, more preferably at least 80 vol % SiC) which has both the higher purity and adequate strength needed for conventional wafer carrier applications, and preferably the high thermal shock resistance required for RTP applications of the future.

SUMMARY OF THE INVENTION

The present inventors ignored the teachings of the above-mentioned brochure and successfully siliconized the porous converted graphite SiC product having about 80 vol % SiC. It was found that the siliconized SiC body so produced was essentially fully dense and had a room temperature strength (266 MPa) which was essentially equivalent to one commercial Si—SiC material routinely used as kiln furniture in the semiconductor processing industry. Therefore, this new siliconized SiC body comprising converted graphite fulfills the desires of today's semiconductor manufacturers for both the high purity and acceptable strength. Moreover, the commercially adequate room temperature strength of this material is surprising in light of the warnings provided by the brochure of the manufacturer of the porous converted graphite SiC material.

The present inventors further examined the new siliconized material and found that it was essentially unaffected by a severe thermal shock test. In particular, when subjected to the thermal quench test in which the temperature of the environment surrounding the material dropped from 500° C. to 0° C. nearly instantaneously, the subsequent MOR strength of the material dropped by less than 10%. Therefore, this new siliconized SiC body comprising converted graphite fulfills the desires of tomorrow's semiconductor manufacturers for both the high purity and the high thermal shock resistance needed for RTP applications. Moreover, the superior thermal shock resistance of this new material is surprising in light of:

a) the warnings provided by the brochure of the manufacturer of the porous converted graphite SiC material, particularly as they relate to thermal stresses produced by siliconization, b) the failure of conventional Si—SiC products to adequately survive the 500° C. thermal shock test, and c) the essential similarity in room temperature strengths and 300° C. thermal shock test performance between the commercial Si—SiC product and the new material.

It was also found that the material of the present invention possessed a high temperature (1300° C.) flexural strength which was superior to the commercial siliconized SiC material.

Therefore, in accordance with the present invention, there is a provided a process for making a high strength, thermal shock resistant, high purity siliconized silicon carbide material, comprising the steps of:

a) providing a porous converted graphite SiC body having at least 71 vol % SiC, and b) siliconizing the porous converted graphite SiC body to essentially full density to produce a siliconized silicon carbide composite body.

Preferably, step a) is achieved by i)) providing a porous graphite body, and ii)) exposing the porous graphite body to a reactant in a manner sufficient to produce a porous converted graphite SiC body having at least 71 vol % converted graphite SiC.

Also in accordance with the present invention, there is provided a high strength, thermal shock resistance, high purity siliconized silicon carbide composite material, the material having at least about 71 vol % converted-graphite silicon carbide matrix having open porosity, wherein the open porosity of the SiC material is filled with silicon.

Also in accordance with the present invention, there is provided a semiconductor manufacturing kiln furniture component, preferably in the form of a component suitable for use in RTP applications, wherein said component comprises the high strength, thermal shock resistance, high purity siliconized silicon carbide material discussed above.

Also in accordance with the present invention, there is provided a method of using a semiconductor wafer manufacturing kiln furniture component, preferably in the form of a component suitable for use in RTP applications, wherein said component comprising the high strength, thermal shock resistance, high purity siliconized silicon carbide material discussed above, comprising the steps of:

a) providing a kiln furniture component (preferably in the form of an RTP component) of the new high strength, thermal shock resistance, high purity siliconized silicon carbide material discussed above, and b) exposing the component to a reactive gas used in semiconductor manufacturing in an environment having a peak temperature of from about 800° C. to 1400° C. (from about 1200° C. to 1400° C. in some embodiments).

In some RTP embodiments, the temperature of the environment rises from about room temperature to the peak temperature at a rate of at least 100° C./minute (preferably, at least 600° C./minute).

DETAILED DESCRIPTION OF THE INVENTION

Figure 1:
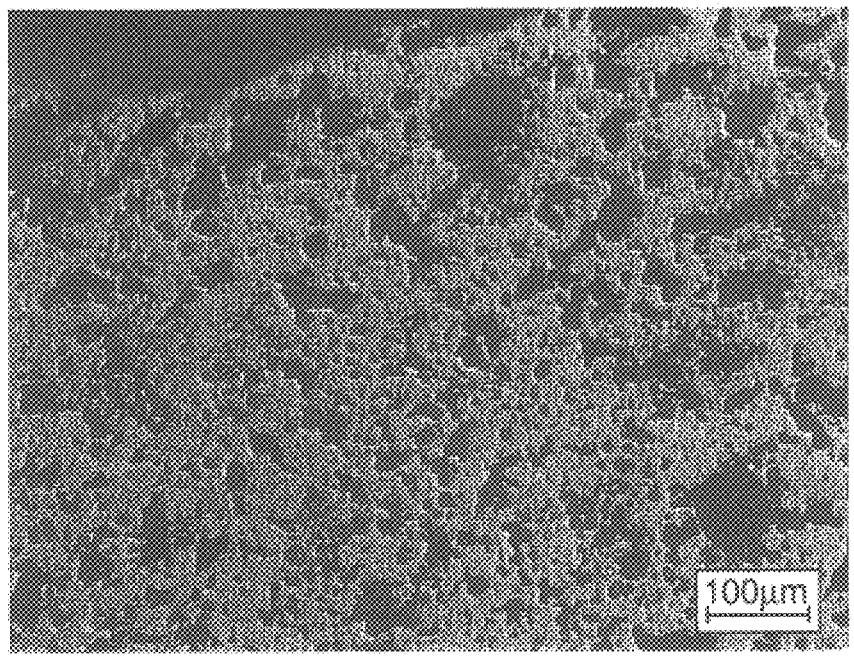
FIG. 1 is a photograph of a prior art microstructure of an unsiliconized porous, converted-graphite SiC body.
Figure 2:
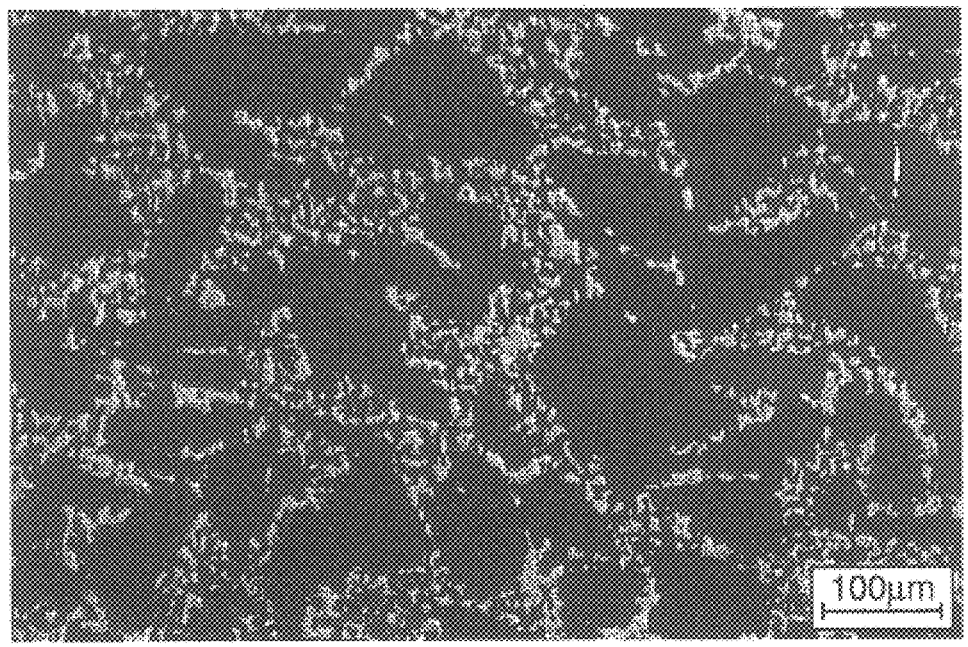
FIG. 2 is a photograph of a prior art microstructure of a siliconized SiC body comprising fine and coarse alpha—SiC grains.

In one embodiment of making the present invention, a commercially available porous converted graphite material having at least 71 vol % SiC is siliconized. One suitable commercially available porous converted graphite SiC material is SUPERSiC®, marketed by Poco Graphite, Inc. of Decatur, Tex. This material is a porous SiC made of converted graphite comprising about 80 vol % beta—SiC. The SiC microstructure of a converted graphite body retains the general look of a graphite microstructure and so is unique among SiC microstructures and is well-known to the skilled artisan. A photomicrograph of this material is shown in FIG. 1. The microstructure is characterized by an essential absence of discrete particles. It also has more substantial necking than comparable conventional porous SiC bodies made from a bimodal mixture of SiC powders. It further has fewer large reservoirs of silicon pockets than the comparable bimodal SiC bodies. In general, the absence of coarse SiC particles, the higher degree of necking, and the relative absence of large silicon pockets makes the structure of the converted graphite body much more homogeneous than the comparable recrystallized bimodal SiC bodies. Preferably, the porous graphite starting material has a total metallic impurity content of less than 10 ppm.

It is believed that any converted graphite material having an acceptable amount of continuous porosity to allow for suitable silicon infiltration may also be used as a starting material for siliconization. The porosity of the converted graphite material needs to be in the range of 5 vol % and 29 vol %. If the material has less than 5 vol % porosity, then the porosity is considered to be closed and essentially no infiltration can be expected. More preferably, the material has between 5 vol % and 25 vol % porosity, and 75–95 vol% SiC. In this range, the degree of porosity typically easily allows the essentially complete infiltration of the porosity by silicon, and the vol % of SiC is high enough to produce a strong composite. Most preferably, the material has between 15 vol % and 25 vol % porosity. Typical converted graphite materials contain less than 10 ppm total metallic impurity and less than 0.1 ppm iron impurity.

In another embodiment of making the present invention, a porous converted graphite body is first produced. In this embodiment, the porous graphite body is then converted to a porous stoichiometric SiC body having at least 71 vol % SiC. Conventional procedures for making converted graphite may be followed. One known method for making converted graphite is disclosed in U.S. Pat. No. 4,900,531, the specification of which is incorporated by reference.

If the converted graphite body is made at a low temperature, it may desirable to recrystallize the porous SiC body at a temperature of at least 1600° C. prior to siliconization in order to provide more necking to the body.

The siliconization of the converted graphite material may be undertaken in accordance with the typical siliconization of porous recrystallized silicon carbide bodies. Conventional procedures are disclosed in U.S. Pat. No. 3,951,587, the specification of which is incorporated by reference. For example, in one instance, chunks of solid semiconductor-grade silicon are placed in a furnace near the porous converted graphite body, and the temperature of the furnace is raised past the melting point of the silicon. The molten silicon then wicks through the porous SiC body and provides complete siliconization. In other embodiments, the process for siliconization disclosed in U.S. Pat. No. 4,795,673 ("Frechette") is used.

Without wishing to be tied to a theory, it is hypothesized that some recrystallization of the converted graphite SiC microstructure may occur during siliconization (thereby enhancing the degree of interparticle SiC bonding (or "necking") and producing a stronger material) if the siliconization proceeds at temperatures above about 1600° C. Therefore, in preferred embodiments, the converted graphite is contacted with molten silicon at a temperature of at least 1600° C. (preferably at least 1700° C., and more preferably at least 1800° C.) in order to promote necking.

Preferably, the siliconized silicon carbide composite body produced in accordance with the present invention comprises a SiC matrix of converted graphite having porosity which is essentially filled with silicon, wherein at least 71 vol % of the body is SiC.

Preferably, at least 75 vol % of the body is SiC, more preferably at least 80%. Since the porous converted graphite starting materials must also have adequate porosity to allow for its complete siliconization, in preferred embodiments, the composite has between 75 vol% and 95 vol % SiC and between 5 vol % and 25 vol % silicon. One especially preferred embodiment has about 80 vol % converted graphite SiC. Typically, silicon essentially fills the porosity of the converted graphite SiC matrix, preferably resulting in a composite having no more than 4 vol % final porosity, more preferably less than 2 vol % final porosity, more preferably less than I vol % final porosity. In other words, the composite has a density which is at least 96%, preferably at least 98% of theoretical density, more preferably at least 99% of theoretical density.

Figure 3:
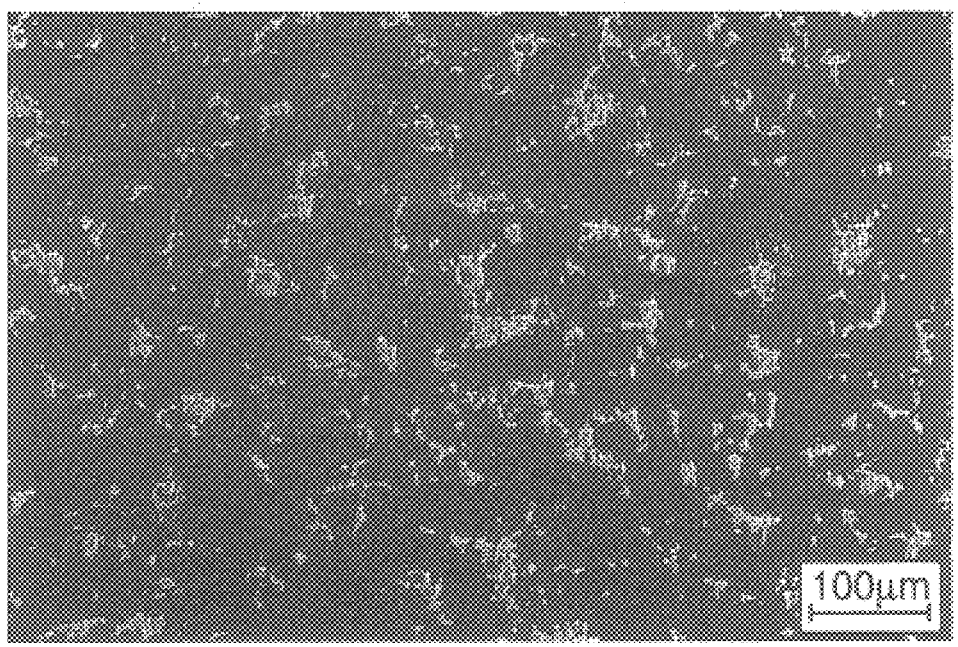
FIG. 3 is a photograph of the present invention, a microstructure of a siliconized converted graphite SiC body.

The SiC microstructure of the composite retains the general look of the porous converted graphite SiC starting material and so is again unique among SiC microstructures and is well-recognizable to the skilled artisan. One photomicrograph of the siliconized converted graphite structure is shown in FIG. 3. Since the typical conversion of graphite produces essentially beta-silicon carbide, essentially all (i.e., at least 90%) of the SiC in this composite is typically beta-silicon carbide. It is known that beta—SiC is a cubic phase, and that a cubic phase material will generally produce an isotropic response. In contrast, alpha—SiC is a hexagonal phase and so is expectedly to produce responses which are more anisotropic. Since it is known that there is a thermal expansion mismatch between silicon and SiC, the isotropic response of the material of the present invention to this mismatch may dampen the stresses produced therefrom, thereby yielding a higher strength. Therefore, in preferred embodiments, the SiC is at least 90 vol % beta—SiC. Accordingly, in some embodiments, the converted graphite SiC comprises at least 90 wt % beta—SiC and the step of siliconizing is performed at a temperature low enough to prevent substantial conversion of the converted graphite beta—SiC and the composite body comprises at least 90 vol % beta—SiC.

Nonetheless, it is contemplated that higher temperature graphite conversion or siliconization processes may be used, thereby partially or fully converting the beta—SiC to alpha—SiC.

Preferably, less than 10 wt % of the SiC is characterized as SiC particles having a size greater than 30 microns (more preferably less than 5 wt %). Without wishing to be tied to a theory, it is believed that a reason for the superior thermal shock resistance of this new material may lie in it having essentially no coarse SiC particles. In particular, whereas the SiC fractions of the above-discussed NT-430 and the commercial Si—SiC materials each possessed about 50 wt % silicon carbide grains having a grain size of between 10 and 150 um, the new material has essentially no SiC grains more coarse than 30 microns. It is believed that the significant difference in thermal expansion coefficients of silicon and SiC grains in these prior art materials causes stress concentrations around the SiC grains during the cooling of the composite after siliconization. However, it is further believed that the spheres of influence of the stress produced by the more coarse SiC grains is much larger than the spheres produced by the smaller SiC grains. Simply, the more coarse SiC grains have increased importance in thermal stress situations. The elimination of the larger and potentially more harmful SiC grains from the siliconized material may reduce the critical sphere of influence of stress concentration produced by cooling (thereby increasing the mechanical properties of the siliconized material) may have been critical to the present invention.

If the elimination of coarse SiC grains is the reason for the improved thermal shock resistance of the new material, this finding is surprising in light of the essential similarity in the room temperature strengths of the commercial siliconized silicon carbide material and the new material, and the apparent resistance of the conventional material to 300° C. thermal shock testing. In particular, if coarse SiC particles have a strong effect on room temperature MOR and thermal shock characteristics, then there should also have been significant differential stresses in the siliconized bodies produced upon their cooling after siliconization, and these stresses might have been reflected in differing results in the room temperature and 300° C. thermal shock tests as well. That a notable performance difference between these materials appears only in the 500° C. thermal shock test is evidence that the effect is quite subtle.

Also, if the elimination of coarse SiC grains is the reason for the improved thermal shock resistance of the new material, this finding is surprising in light of the well known fact that coarse grains often act as crack deflectors which increase the toughness of the ceramic body. Since it is known that thermal shock resistance is enhanced by increasing the toughness of the material, it was considered that the elimination of the coarse grains could have reduced the toughness of the material and thereby reduced its thermal shock resistance.

Although not particularly desired, the composite may contain additional SiC particles (for example, present in an amount of between 1 and 33 vol %) which were either infiltrated into the porous beta—SiC body prior to siliconization, or infiltrated into the porous SiC body at the time of siliconization.

The chemical properties of the composite body were measured and are as follows: The total metallic impurity content of the composite material (as measured by any conventional method such as GDMS or slurry ICP) is typically no more than 10 ppm, preferably no more than 5 ppm, more preferably no more than 1 ppm. The iron impurity content of the composite material (as measured by GDMS or slurry ICP) is typically no more than 1 ppm, preferably no more than 0.5 ppm, more preferably no more than 0.1 ppm. The titanium impurity content of the composite material (as measured by GDMS or slurry ICP) is typically no more than 3 ppm, preferably no more than 1 ppm. The aluminum impurity content of the composite material (as measured by GDMS or slurry ICP) is typically no more than 5 ppm, preferably no more than 1 ppm, more preferably no more than 0.5 ppm. In comparison, the conventional siliconized SiC material has about 80–100 ppm total metallic impurity and about 1 ppm iron impurity.

Preferably, the composite of the present invention has a thermal conductivity of at least 85 W/mK at 400° C., and of at least 50 W/mK at 800° C. The superior thermal conductivity of the material of the present invention at high temperatures is demonstrated in Table II below, which reveals values which are about 10–15% higher than those of the commercial siliconized SiC material. It is possible that the somewhat higher thermal conductivity of the siliconized converted graphite material is the cause of its superior 500° C. thermal shock resistance. When a material is thermally shocked, its survival depends in part upon its ability to quickly dissipate heat, thereby minimizing its internal temperature gradients. It is possible that the higher thermal conductivity of the material of the present invention allows it to more quickly and evenly dissipate heat, thereby minimizing the stress-inducing temperature gradient typically associated with thermal shock failure.

However, it is further noted that although the thermal conductivity of the material of the present invention is higher than the commercially available siliconized material, it is only about 10–15% higher. Therefore, it is hypothesized that the practical effect of this moderate increase in thermal conduction is subtle and is only revealed under certain conditions in which the 10–15% difference is critical. For example, while the 10–15% difference does not appear to make a difference in the 300° C. thermal shock test (reported in Table I below), it appears to make a great deal of difference in the 500° C. thermal shock test. To the extent that the apparently similar performance of these materials in a 300° C. thermal shock test provides an expectation of similar results in higher temperature tests, the superior 500° C. thermal shock resistance of the material of the present invention is surprising.

As noted above, the superior thermal conductivity of the material of the present invention is demonstrated in Table II below as being about 10–15% higher than that of the commercially available siliconized SiC. Since SiC has a significantly higher thermal conductivity than silicon (by almost an order of magnitude), it is clear that the dissipation of heat in these bodies is likely carried out mainly by its conduction through the SiC phase. However, since each of these materials contains about 80 vol % SiC, the difference in thermal conductivity between these two materials can not be explained solely on the basis of any difference in SiC content. Rather, it is believed that the superior thermal conductivity of the material of the present invention may be due to the higher connectivity of its SiC phase (as compared to the conventional SiC material). Analysis of the material of the present invention revealed that its SiC phase is fairly continuous throughout its microstructure. In other words, the "veins" of the SiC phase are relatively and uniformly thick. In contrast, the commercially available siliconized SiC material is essentially characterized by coarse SiC particles partially connected to each other by smaller recrystallized SiC particles which are not as wide as the vein thickness of the converted graphite material of the present invention. In other words, the commercial material has a low degree of necking. Thus, it is possible that heat is more easily conducted through the material of the present invention because its uniformly thick SiC veins do not present as many high resistance necks as the commercially available material.

Figure 4:
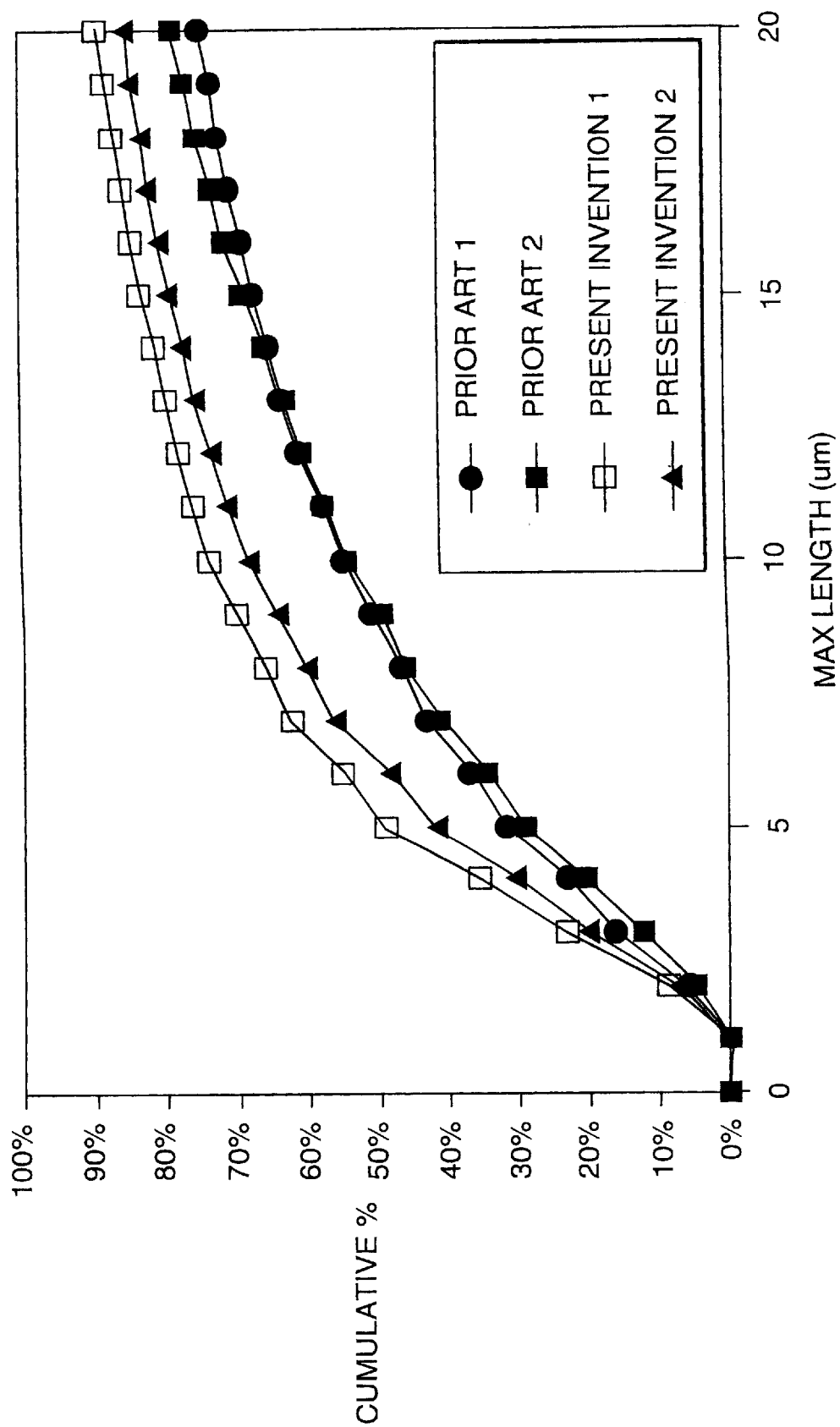
FIG. 4 is a graph comparing the maximum lengths of silicon pockets in the material of the present invention and a competitive prior art material.

Limited quantitative analysis of the microstructures of these two materials provides information which is fairly consistent with this hypothesis. In one analytic exercise, the maximum length of discrete silicon pockets was characterized by 2-D analysis of a polished microstructure. It is believed that high maximum length values are characteristic of greater connectivity of silicon pockets, and consequently less connectivity of the SiC phase (which is important to heat conduction). The maximum length values in the material of the present invention (as compared to the siliconized commercial material) are presented in FIG. 4. This FIG. 4 shows that between 65–75% of the silicon pockets in the present invention have a maximum length of less than 10 um. In contrast, no more than 55% of the silicon pockets in the conventional material have a maximum length of less than 10 um. Therefore, in preferred embodiments of the present invention, at least 60% of the silicon pockets in the present invention material have a maximum length of less than 10 um.

The mechanical properties of the composite body are as follows: Typically, the composite has a room temperature 4-point bending strength of at least about 230 MPa, preferably at least about 250 MPa. It has a 1300° C. 4-point bending strength of at least about 200, MPa, preferably at least about 220 MPa. Its 500° C. thermal shock resistance (as characterized by its room temperature strength measured after being quenched in ice water from a temperature of about 500° C.) is typically at least 80% of its pre-test strength (preferably at least 90%), and is typically at least about 230 MPa (preferably at least 250 MPa).

Since the porous converted graphite matrix is characterized by a relatively homogeneous microstructure (i.e., absence of discrete particles, essentially no coarse particles and few large silicon pockets), the resulting "converted graphite" SiC matrix is also similarly characterized as homogeneous.

Another reason for the superior thermal shock property of the material of the present invention may lie in its higher degree of homogeneity. Simply, a composite material having a more homogeneous structure will be better able to both conduct heat and respond to stress than more inhomogeneous materials. In this regard, the material of the present invention has been found to have uniformly thick SiC veins and small silicon pockets. In contrast, the commercial siliconized material has thin SiC necks and large silicon pockets.

Figure 5:
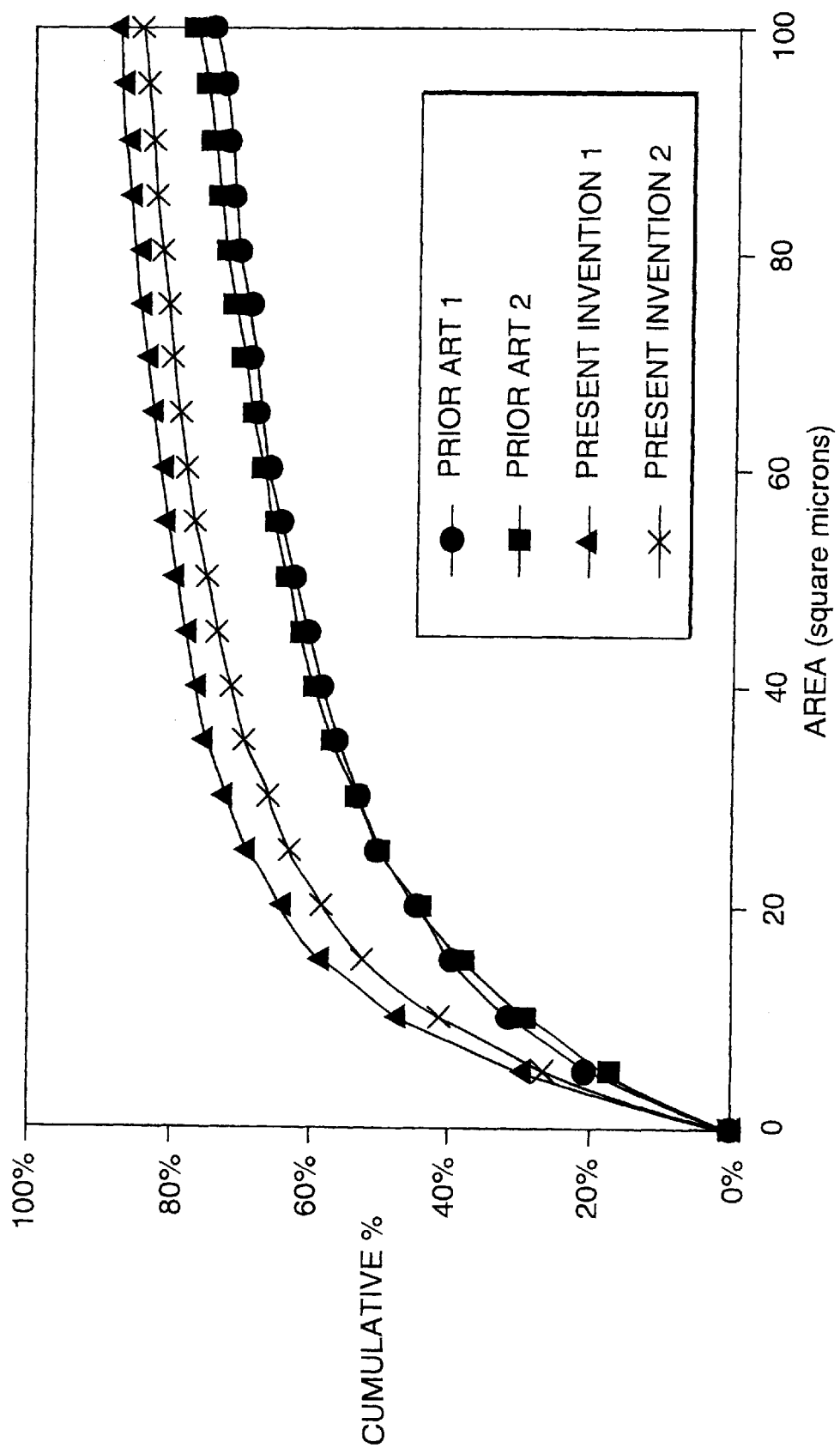
FIG. 5 is a graph comparing the relative areal sizes of silicon pockets in the material of the present invention and a competitive prior art material.

Further quantitative analysis of the microstructures of these two materials provides information which is again fairly consistent with this hypothesis. In another analytic exercise, the area of each individual silicon pockets was measured. It is believed that a tight unimodal distribution of relatively small areas is characteristic of a well dispersed silicon phase. As shown in FIG. 5 below, the area of the average pocket in the material of the present invention is smaller than that of the commercial siliconized material. This Figure shows that between 55–65% of the silicon pockets in the present invention have an area of less than 20 um$^2$. In contrast, about 45% of the silicon pockets in the conventional material have an area of less than 20 um$^2$. Therefore, in preferred embodiments of the present invention, at least 50% of the silicon pockets have an area of less than 20 um$^2$. Moreover, the distribution of pockets appears to be more narrow (the initial slope is more steep), thereby indicating a higher degree of homogeneity in the material of the present invention.

Preferably, the composite of the present invention has a thermal expansion coefficient of no more than $5\times10^{-6}$/° C., preferably no more than $4.5\times10^{-6}$/° C. The overall thermal expansion coefficient of the material of the present invention is significantly lower than that of the commercial siliconized material. See Table II. Since a lower thermal expansion coefficient would appear to produce less stresses during thermal cycling, it is believed that the lower thermal expansion coefficient of the material present invention has a role in its apparently superior high temperature performance properties. Because the composite of the present invention has high purity and a good room temperature strength and a good high temperature strength, it can be suitably used as a kiln furniture material for conventional semiconductor wafer manufacturing. Such components typically include horizontal wafer boats, vertical racks, process tubes, and paddles.

Because the composite of the present invention also has a superior thermal shock resistance it appears to be the ideal candidate for use in rapid thermal processing applications. In such applications, the composite can be the material of construction for RTP processing such as bell jar chambers and wafer susceptors. In some preferred RTP applications, the processing environment is increased at a rate of at least 150° C./minute, preferably at least about 600° C./minute. In some RTP applications, the processing environment is cooled at a rate of at least 100° C./minute In some preferred applications involving fast ramp furnaces, the processing environment is increased at a rate of between 40 and 100° C./minute, preferably between 60 and 100° C./minute.

EXAMPLE 1

A portion of a commercial wafer boat made of "converted graphite" SiC material having about 20 vol % porosity was placed in a siliconized SiC channel, and the channel was filled with chunks of electronic grade silicon. The boat, silicon and channel were then placed in an induction furnace and heated to about 1850° C. After cooling, the siliconized article was then sandblasted to remove excess silicon.

The siliconized article was then subjected to a battery of conventional mechanical tests, including room temperature 4 point flexural strength, 1300° C. 4 point flexural strength, 300° C. thermal shock, 500° C. thermal shock. The thermal shock tests were carried out by heating the article to the test temperature in a furnace removing the article and immediately quenching it in a pail of about 0° C. water within about one second of its removal from the furnace.

Other characteristics of these articles were also measured, including thermal diffusivity, thermal expansion coefficient. The thermal expansion coefficient was obtained by conventional dilatometry. The thermal diffusivity values were measured by a laser flash technique. The specific heat of the materials was measured by differential scanning calorimetry. The thermal conductivity of the materials was then determined via the so-obtained thermal diffusivity and specific heat values.

Lastly, the microstructure of the siliconized material was prepared for quantitative analysis by mounting and polishing small sections. A series of image analysis measurements were performed on two separate sections.

The results of these tests are reported in Tables I and II below, in FIGS. 3–5 and in the text above.

COMPARATIVE EXAMPLE 1

A sample of siliconized CRYSTAR, a siliconized silicon carbide material having about 80 vol % SiC and commercially available from Norton Electronics, Worcester, Mass., was obtained. This sample was subjected to the same tests as in Example 1. The results of the analysis are likewise reported.

As seen in Table 1, this Comparative Example has essentially the same density and room temperature strength, and 300° C. thermal shock resistance as the present invention, but it has a much worse 500° C. thermal shock resistance and a worse 1300° C. flexural strength.

COMPARATIVE EXAMPLE II

A sample of porous SUPERSIC®, a converted graphite silicon carbide material having about 80 vol % SiC and commercially available from Poco Graphite, Inc. of Decatur, Tex., was obtained. This sample was subjected to the same tests as in Example 1. The results of the analysis are reported below in Table 1. The weak strength of this material is evident in nearly all the mechanical tests.

TABLE I

| Material | Density (g/cc) | 4-Point Bend Strength at 22° C. (MPa) | 4-point Bend Strength at 1300° C. (MPa) | Thermal Shock @ 300° C. (MPa) | Thermal Shock @ 500° C. (MPa) |
|---|---|---|---|---|---|
| Example 1 (siliconized converted graphite) | 3.04 | 266 | 221 | 294 | 269 |
| Comp. Ex 1 (commercial siliconized SiC material) | 3.02 | 261 | 194 | 260 | 158 |
| Comp. Ex 2 (unsiliconized converted graphite) | 2.63 | 208 | 180 | 195 | 77 |

TABLE II

| Material | Thermal Expansion Coefficient | Thermal Conductivity (W/mK) | | | |
|---|---|---|---|---|---|
| | | at 22° C. | at 400° C. | at 800° C. | at 1300° C. |
| Example 1 (siliconized converted graphite) | $4.6 \times 10^6/°$ C. | 223 | 88 | 53 | 36 |
| Comp. Ex 1 (commercial siliconized SiC material) | $5.1 \times 10^6/°$ C. | 222 | 80 | 46 | 31 |
| Comp. Ex 2 (unsiliconized converted graphite) | $4.6 \times 10^6/°$ C. | 172 | 69 | 42 | 30 |

We claim:

1. A process for making a high strength, thermal shock resistance, high purity siliconized carbide material, comprising the steps of:

a) providing a porous converted graphite SiC body having at least 71 vol% SiC and, b) siliconizing the porous converted graphite SiC body to essentially full density, wherein the porous graphite SiC body has a total metallic impurity content of no more than 10 ppm total metallic impurity.

2. The process of claim 1, wherein the porous converted graphite body of step a) is obtained by the step of exposing a porous graphite body to a rectant in a manner sufficient to produce a porous converted graphite SiC body having at least 71 vol% SiC.

3. The process of claim 1, wherein the converted graphite SiC comprises at least 90 wt% beta—SiC and the step of siliconizing is performed at a temperature low enough to prevent substantial conversion of the converted graphite beta—SiC and the composite body comprises at least 90 vol% beta—SiC.

4. The process of claim 1 wherein the siliconization step produces a composite having a density of at least 96% of theoretical density.

5. The process of claim 1 wherein the porous converted graphite SiC body comprises between 75 vol% and 95 vol% SiC.

6. The porous of claim 1 wherein less than 10 wt% of the SiC matrix of the converted graphite SiC body comprises SiC grains larger than 30 microns.

7. The process of claim 1 wherein the siliconization is carried out at a temperature of at least 1600° C.

8. The process of claim 1 wherein the siliconization is carried out at a temperature of at least 1700° C.

9. The process of claim 1 further comprising the step of:
   c) recrystallizing the porous SiC body at a temperature of at least 1600°C. prior to the siliconization of step b).

* * * * *